US012601826B2

(12) United States Patent \
Wintermantel

(10) Patent No.: US 12,601,826 B2 \
(45) Date of Patent: Apr. 14, 2026

(54) RADAR MODULATION METHOD WITH A HIGH DISTANCE RESOLUTION AND LITTLE SIGNAL PROCESSING OUTLAY

(71) Applicant: Continental Autonomous Mobility Germany GmbH, Ingolstadt (DE)

(72) Inventor: Markus Wintermantel, Lindau (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 314 days.

(21) Appl. No.: 18/041,342

(22) PCT Filed: Jul. 9, 2021

(86) PCT No.: PCT/DE2021/200092 \
§ 371 (c)(1), \
(2) Date: Feb. 10, 2023

(87) PCT Pub. No.: WO2022/033639 \
PCT Pub. Date: Feb. 17, 2022

(65) Prior Publication Data

US 2023/0296750 A1     Sep. 21, 2023

(30) Foreign Application Priority Data

Aug. 10, 2020    (DE) ..................... 10 2020 210 079.9

(51) Int. Cl. \
*G01S 13/34*          (2006.01) \
*G01S 7/02*           (2006.01) \
(Continued)

(52) U.S. Cl. \
CPC .......... *G01S 13/347* (2013.01); *G01S 7/0232* (2021.05); *G01S 7/356* (2021.05); *G01S 13/343* (2013.01); *G01S 13/931* (2013.01)

(58) Field of Classification Search \
CPC .... G01S 13/931; G01S 13/343; G01S 13/584; G01S 13/347; G01S 7/356 \
(Continued)

(56) References Cited

U.S. PATENT DOCUMENTS 4,713,664 A * 12/1987 Taylor, Jr. ........... G01S 13/5246 \
342/91 \
5,963,163 A    10/1999 Kemkemian \
(Continued)

FOREIGN PATENT DOCUMENTS

CN        102680967 A     9/2012 \
CN        104280728 A     1/2015 \
(Continued)

OTHER PUBLICATIONS

German Search Report dated Apr. 15, 2021 for the counterpart German Patent Application No. 10 2020 210 079.9. \
(Continued)

*Primary Examiner* — Michael W Justice \
(74) *Attorney, Agent, or Firm* — Buchanan Ingersoll & Rooney PC

(57) ABSTRACT

A method of controlling a radar system is presented, for detecting the surroundings using transmission means for emitting transmission signals which contain a sequence of at least approximately identical individual signals, the sequence of individual transmission signals being repeated cyclically, said method being characterized in that over the sequence of the individual signals the frequency position thereof—optionally apart from a varying and at least approximately mean value-free component—is changed at least approximately linearly and, in the process, the slope of the linear frequency position change over the individual transmission signals is at least sometimes varied from sequence to sequence, in particular in order to increase the (Continued)

radial distance and/or relative speed measurement accuracy and/or in order to be more robust in respect of interference with other radar systems.

12 Claims, 7 Drawing Sheets

(51) Int. Cl.
  *G01S 7/35* (2006.01)
  *G01S 13/931* (2020.01)
(58) Field of Classification Search
  USPC ................................. 342/70, 157, 196, 112
  See application file for complete search history.

(56) References Cited

U.S. PATENT DOCUMENTS

| | | | |
|---|---|---|---|
| 5,982,319 | A | 11/1999 | Borden |
| 6,670,907 | B2 | 12/2003 | Cho |
| 7,821,422 | B2 | 10/2010 | Hutchison |
| 7,999,724 | B2 | 8/2011 | Cho |
| 9,024,809 | B2 * | 5/2015 | Testar .................. G01S 13/343 342/128 |
| 9,103,910 | B2 * | 8/2015 | Holder .................... G01S 13/06 |
| 9,529,078 | B2 * | 12/2016 | Holder ................. G01S 7/2927 |
| 9,557,412 | B2 | 1/2017 | Hilsebecher |
| 10,234,541 | B2 * | 3/2019 | Goda ...................... G01S 7/352 |
| 10,536,154 | B2 * | 1/2020 | Kitamura ............. G01S 13/931 |
| 10,545,227 | B2 | 1/2020 | Kuehnle |
| 10,843,690 | B2 * | 11/2020 | Shalev-Shwartz .......................... B60W 30/18163 |
| 10,850,728 | B2 * | 12/2020 | Shalev-Shwartz .......................... B60W 50/0097 |
| 10,933,868 | B2 * | 3/2021 | Shalev-Shwartz .... G01S 17/931 |
| 11,029,388 | B2 * | 6/2021 | Melzer ................. G01S 7/4017 |
| 11,057,170 | B2 | 7/2021 | Hammond |
| 11,513,187 | B2 | 11/2022 | Stettiner |
| 2003/0142000 | A1 | 7/2003 | Cho |
| 2005/0046597 | A1 | 3/2005 | Hutchison |
| 2008/0309546 | A1 | 12/2008 | Wakayama |
| 2009/0303108 | A1 | 12/2009 | Hilsebecher |
| 2010/0149023 | A1 | 6/2010 | Cho |
| 2010/0289692 | A1 * | 11/2010 | Winkler ................ G01S 13/584 342/112 |
| 2012/0001791 | A1 | 1/2012 | Wintermantel |
| 2012/0235854 | A1 * | 9/2012 | Testar .................. G01S 13/343 342/109 |
| 2014/0253365 | A1 | 9/2014 | Kirsch et al. |
| 2015/0002332 | A1 | 1/2015 | Bi et al. |
| 2015/0109165 | A1 * | 4/2015 | Holder ................. G01S 7/2922 342/159 |
| 2015/0331096 | A1 | 11/2015 | Schoor et al. |
| 2016/0033623 | A1 * | 2/2016 | Holder ................. G01S 7/0234 342/93 |
| 2016/0124075 | A1 | 5/2016 | Vogt et al. |
| 2017/0123058 | A1 * | 5/2017 | Yavari ..................... G01S 13/86 |
| 2017/0307727 | A1 * | 10/2017 | Goda .................... G01S 13/584 |
| 2018/0203105 | A1 | 7/2018 | Kuehnle |
| 2018/0356229 | A1 | 12/2018 | Porsandeh Khial et al. |
| 2018/0356511 | A1 | 12/2018 | Buddendick |
| 2019/0113600 | A1 | 4/2019 | Melzer et al. |
| 2019/0235051 | A1 * | 8/2019 | Melzer .................... G01S 7/032 |
| 2019/0265346 | A1 * | 8/2019 | Hakobyan ............. G01S 13/343 |
| 2019/0291726 | A1 * | 9/2019 | Shalev-Shwartz .... B60W 10/06 |
| 2019/0291728 | A1 * | 9/2019 | Shalev-Shwartz .... B60W 40/06 |
| 2019/0299984 | A1 * | 10/2019 | Shalev-Shwartz .......................... B60W 30/165 |

| | | | |
|---|---|---|---|
| 2019/0334534 | A1 * | 10/2019 | Kitamura ................. H04B 1/30 |
| 2019/0337509 | A1 * | 11/2019 | Shalev-Shwartz .... B60W 40/06 |
| 2019/0377089 | A1 | 12/2019 | Rohner |
| 2020/0036487 | A1 | 1/2020 | Hammond |
| 2020/0041611 | A1 | 2/2020 | Scherz |
| 2021/0156982 | A1 | 5/2021 | Stettiner |
| 2021/0165088 | A1 | 6/2021 | Suzuki |
| 2022/0236406 | A1 | 7/2022 | Wintermantel |

FOREIGN PATENT DOCUMENTS

| | | |
|---|---|---|
| CN | 105264400 A | 1/2016 |
| CN | 108333581 A | 7/2018 |
| CN | 109669161 A | 4/2019 |
| CN | 109923435 A | 6/2019 |
| CN | 110651167 A | 1/2020 |
| CN | 110651197 A | 1/2020 |
| CN | 110794393 A | 2/2020 |
| DE | 102009016480 A1 | 10/2010 |
| DE | 102013200404 A1 | 7/2014 |
| EP | 2629113 B1 | 4/2017 |
| JP | 2004151022 A | 5/2004 |
| JP | 2012522972 A | 9/2012 |
| JP | 2019049521 A | 3/2019 |
| JP | 2019536011 A | 12/2019 |
| KR | 20150021604 A | 3/2015 |
| WO | 2014/075838 A1 | 5/2014 |
| WO | 2018086783 A1 | 5/2018 |
| WO | 2019234946 A1 | 12/2019 |

OTHER PUBLICATIONS

The International Search Report and the Written Opinion of the International Searching Authority mailed on Oct. 5, 2021 for the counterpart PCT Application No. PCT/DE2021/200092.

Notice of Reasons for Refusal drafted Sep. 29, 2023 for the counterpart Japanese Patent Application No. 2023-507671 and English translation of same.

Non-Final Office Action dated Apr. 9, 2025 for the priority U.S. Appl. No. 18/041,330.

First Office Action dated Apr. 14, 2025 for the counterpart Chinese Patent Application No. 202180056465.7 and machine translation of same.

First Office Action dated Apr. 16, 2025 for the counterpart Chinese Patent Application No. 202180055854.8 and machine translation of same.

Examination Report dated Jun. 3, 2025 for the counterpart European Patent Application No. 21 727 360.6 and machine translation of same.

Florian Engels et al., "Advances in Automotive Radar: A Framework on Computationally Efficient High-Resolution Frequency Estimation" IEEE Signal Processing Magazine ( vol. 34, Issue: 2, Mar. 2017), pp. 36-46, DOI: 10.1109/MSP.2016.2637700.

Notice of Allowance issued by the U.S. Patent and Trademark Office in the U.S. Appl. No. 18/041,320, mailed Aug. 12, 2025, U.S. Patent and Trademark Office, Alexandria, VA. (13 pages).

Office Action (The Second Office Action) issued Aug. 22, 2025, by the State Intellectual Property Office of People's Republic of China in corresponding Chinese Patent Application No. 202180056465.7 and an English translation of the Office Action. (7 pages).

Notice of Allowance (Notice to Grant of Patent Right) issued Jan. 13, 2026, by the State Intellectual Property Office of People's Republic of China in corresponding Chinese Patent Application No. 202180056465.7 and an English machine translation of the Office Action. (6 pages).

* cited by examiner

RADAR MODULATION METHOD WITH A HIGH DISTANCE RESOLUTION AND LITTLE SIGNAL PROCESSING OUTLAY

CROSS-REFERENCE TO RELATED APPLICATIONS

The present application is a National Stage Application under 35 U.S.C. 371 of International Patent Application No. PCT/DE2021/200092 filed on Jul. 9, 2021, and claims priority from German Patent Application No. 10 2020 210 079.9 filed on Aug. 10, 2020, in the German Patent and Trade Mark Office, the disclosures of which are herein incorporated by reference in their entireties.

BACKGROUND

1. Field

Embodiments of the present application relate to a method for controlling a radar system and a radar system to be deployed for driver assistance systems in motor vehicles having a high distance resolution and a low signal processing load.

2. Description of Related Art

Motor vehicles are increasingly being equipped with driver assistance systems which detect the surroundings with the aid of sensor systems and derive automatic reactions of the vehicle and/or instruct, in particular warn, the driver, as a result of the traffic situation thus recognized. A distinction is made between comfort and safety functions.

As a comfort function, Full Speed Range Adaptive Cruise Control (FSRA) plays an important role in the current development. The vehicle adjusts the ego speed to the desired speed predefined by the driver, provided the traffic situation permits this; otherwise, the ego speed is automatically adapted to the traffic situation. In addition, Lane Change Assist with its extension to an at least partially automated lane change function is gaining in importance.

In addition to increasing comfort, the focus is increasingly on safety functions, with the reduction of the braking or stopping distance in emergency situations playing an important role. The corresponding driver assistance functions range from prefilling the brake automatically in order to reduce braking latency up to autonomous emergency braking.

Radar sensors are predominantly deployed nowadays for driver assistance systems of the type described above. These work reliably even in poor weather conditions and, in addition to the spacing of objects, can also directly measure their radial relative speed using the Doppler effect. In particular, 24 and 77 GHz are deployed as transmission frequencies.

The aforementioned functions require a fairly high sensor range and, at the same time, high distance measurement accuracy, resolution and separation capability. Therefore, high distance resolution and separation capability are also important because they can at least partially offset the poor angular resolution and separation capability of automotive radar sensors (resulting from their small size). Admittedly, a simultaneous large range and high distance resolution typically require a high digital signal processing outlay, which is difficult to realize since corresponding signal processors for use in a motor vehicle are, nowadays, only available to a limited extent or are expensive.

Methods are proposed in DE 10 2013 200 404 A1 and WO 2018/086783 A1, which are intended to allow a large range and high distance resolution combined with moderate digital signal processing outlay. Admittedly, these methods miss the target of a high distance resolution, in particular at high radial relative speed, and then also have a reduced sensitivity, i.e., range.

SUMMARY

Aspects of the present application provide a method for a radar system and a radar system, in which a large range and high distance resolution can be simultaneously achieved, even for relatively moving objects, with moderate outlay for the digital signal processing.

In principle, this problem is solved with the aid of a radar method and a radar system according to FIG the claims. According to aspects of the embodiments, radar modulation and the signal evaluation are to be designed in order to be able to achieve a high measurement accuracy and resolution both for the distance and for the relative speed of objects.

The advantages of the embodiments result from the fact that sensors having a simultaneously large range and high distance resolution can be achieved with comparatively inexpensive signal processors which are available today for motor vehicle applications, in order to, e.g., be able to implement sophisticated next-generation driver assistance systems. As a general rule, such signal processors have a simpler construction and, in addition, the advantage that they consume less electrical power.

In the method according to the embodiment for a radar system for detecting the surroundings, said radar system has transmission means for emitting transmission signals which contain a sequence of at least approximately identical individual signals.

Over the sequence of the individual signals, the frequency position thereof (which is in particular characterized by the center frequency thereof) and the time interval thereof (optionally in each case apart from a varying and at least approximately mean value-free component) are at least approximately linearly changed. The amount of the relative change in the time interval is at least approximately twice as large as the relative change in the frequency position, the algebraic signs of these changes being opposite.

A random or pseudo-random component can be expediently superimposed on the frequency position, the time interval and/or the phase position of the individual signals.

The frequency of the individual signals is preferably linearly modulated and the slope of the frequency modulation is at least approximately identical for all the individual signals, the individual transmission signals being frequency ramps.

According to an advantageous conFIGuration of the method, for K frequency ramps, hereinafter numbered $k=0, \ldots, K-1$, in each case I digital received values, hereinafter numbered $i=0, \ldots, I-1$, can be acquired in each case for multiple receiving channels. A two-dimensional discrete Fourier transform can then be carried out over the I·K received values in each case, optionally not completely and preferably with the aid of one-dimensional fast Fourier transforms. In this case, the dimension resulting from the received value index dimension i following transformation can be referred to as distance gates $j=0, \ldots, J-1$ and the dimension resulting from the frequency ramp dimension can be referred to as Doppler gates $I=0, \ldots, L-1$.

The linear changes in the frequency position and the time interval of the individual frequency ramps can additionally lead to the received signals from transmission signals reflected by objects after the two-dimensional discrete Fourier transform also leading to sharp power peaks when the objects are moving towards or away from the radar system, that is to say they have a relative radial motion component.

The linear change in the frequency position of the frequency ramps can be advantageously taken into account in that, for the determination of the radial relative speed of an object, the position of its power peaks after the two-dimensional discrete Fourier transform is substantially corrected in the Doppler gate dimension I by a component which is linearly dependent on the distance gate dimension j. The linearity factor results from the quotient of the change in the frequency position over the frequency ramps and the change in the frequency within the reception period during the individual frequency ramps. The position of the power peak is preferably determined by interpolation which, as a general rule, results in non-integer values for the distance gate dimension j and/or the Doppler gate dimension I.

The linear change in the frequency position of the individual frequency ramps can expediently be taken into account in that, after a one-dimensional discrete Fourier transform over the I received values per frequency ramp k=0, . . . , K–1, the phases of the values resulting in the distance gate dimension j are in each case corrected by a phase component proportional with respect to the product $2\pi \cdot j \cdot k/K$, with the proportionality factor substantially resulting from the quotient of the change in the frequency position over the frequency ramps and the change in the frequency within the reception period during the individual frequency ramps. The correction can then be realized by multiplication with a complex vector of length 1 and corresponding phase.

The sequence of K individual transmission signals can be repeated cyclically, the slope of the linear frequency position change over the individual transmission signals being at least sometimes varied from sequence to sequence (i.e., at least in one sequence or one of the sequences), in particular in order to increase the radial distance and/or relative speed measurement accuracy and/or in order to be more robust in respect of interference occurring with other radar systems.

The individual transmission signals preferably represent frequency ramps, with two cycles having an inverse slope, i.e., a slope differing by a factor of –1, being utilized for an accurate radial distance and/or relative speed measurement of an object. In this case, the sum and the difference of its positions of the power peak resulting in the two cycles after the two-dimensional discrete Fourier transform are only substantially utilized in the Doppler gate dimension, but not in the distance gate dimension.

Additionally, the sequence of K individual frequency ramps can be repeated cyclically, the slope of the frequency ramps being automatically varied at least sometimes from sequence to sequence, i.e., at least in one sequence, in particular in order to be more robust in respect of interference with other radar systems.

The sequence of K individual transmission signals can be expediently repeated cyclically, the mean time interval being at least sometimes varied from sequence to sequence, i.e., at least in one sequence, in particular in order to resolve ambiguities in the determination of the radial relative speed and/or in order to be more robust in respect of interference with other radar systems.

Multiple receiving channels can preferably be realized by multiple transmitting and/or receiving antennas. In addition to the two-dimensional discrete Fourier transform over I·K received values in each case, a digital beam shaping over receiving channels or in order to generate receiving channels can additionally be provided.

In an alternative aspect, the present embodiment additionally relates to a radar system for detecting the surroundings, comprising transmission means for emitting transmission signals which contain a sequence of at least approximately identical individual signals. The radar system is characterized in that, over the sequence of the individual signals, the frequency position thereof (in particular characterized by the center frequency thereof), and the time interval thereof (optionally in each case apart from a varying and at least approximately mean value-free component), are at least approximately linearly changed. The relative change in the time interval is, in terms of amount, at least approximately twice as large as the relative change in the frequency position, the algebraic signs of these changes being opposite.

DETAILED DESCRIPTION

Figure 1:
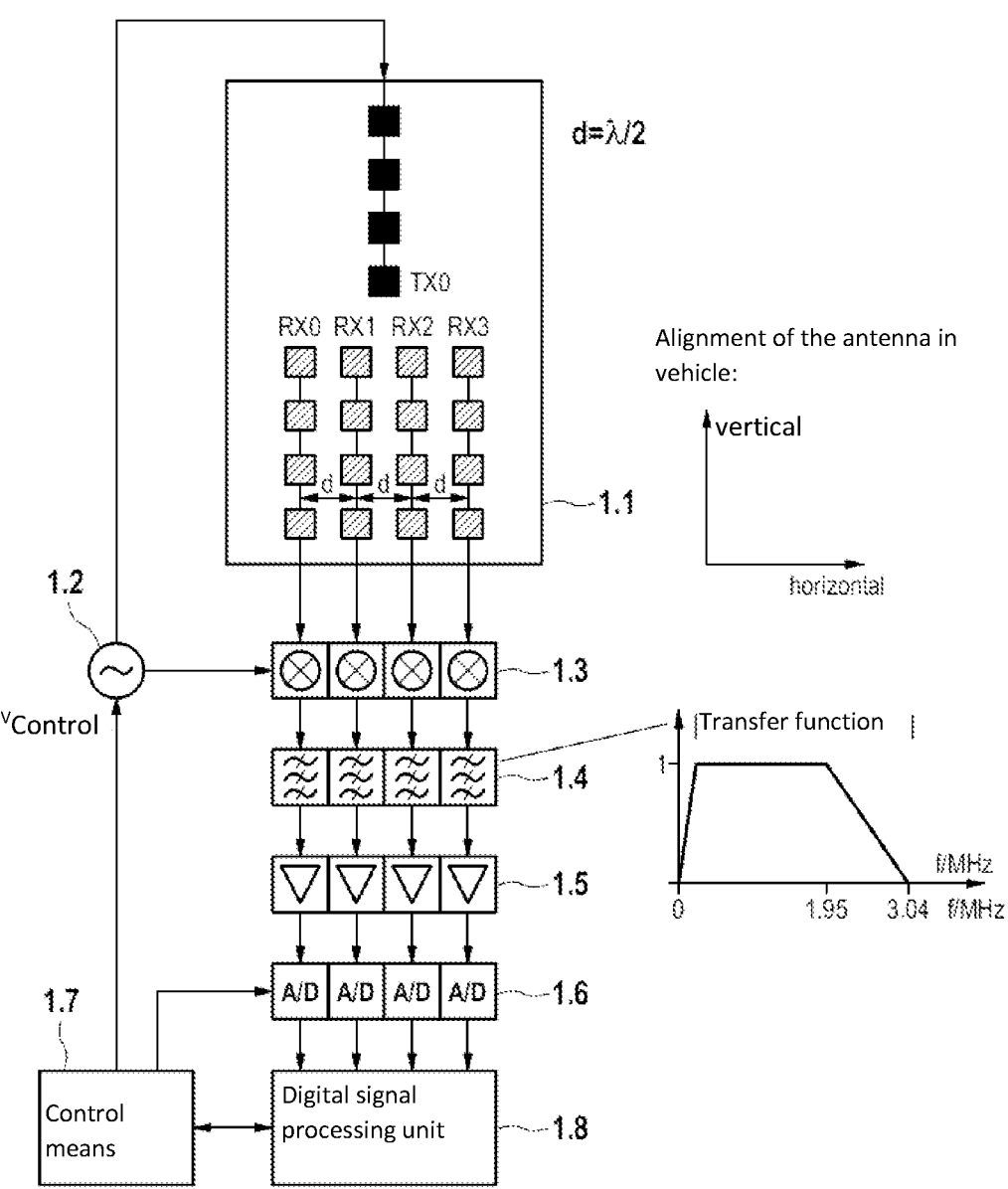
In FIG. 1, the exemplary embodiment of a radar system is depicted.

The exemplary embodiment of a radar system, which is roughly depicted in FIG. 1, is considered. The radar system has a transmitting antenna TX0 for emitting transmission signals and M=4 receiving antennas RX0-RX3 for receiving transmission signals reflected by objects; the antennas are embodied as patch antennas on a planar board 1.1 in planar technology, this board being oriented with respect to the horizontal and vertical direction in the vehicle as depicted in FIG. 1. All of the antennas (transmitting and receiving antennas) preferably each have the same emission characteristic in elevation and azimuth. The 4 receiving antennas (and therefore their phase centers, that is to say, emission centers) each have the same lateral, i.e., horizontal spacing d=$\lambda$/2=1.96 mm with respect to one another, with $\lambda$=c/76.5 GHz=3.92 mm being the mean wavelength of the emitted signals in the frequency band utilized 76-77 GHz and c=$3*10^8$ m/s being the speed of light.

The transmission signals emitted at the transmitting antenna are obtained from the high-frequency oscillator 1.2 in the 76-77 GHz range, which can be changed in its frequency via a control voltage $v_{Control}$. The control voltage is generated in the control means 1.7, these control means containing, e.g., a phase-locked loop or a digital/analog converter, which are driven in such a way that the frequency profile of the oscillator corresponds to the desired frequency modulation.

The signals received by the four receiving antennas are likewise mixed down in parallel in the real-valued mixers 1.3 with the signal of the oscillator 1.2 into the low-frequency range. The received signals then pass through the bandpass filters 1.4 having the depicted transfer function, the amplifiers 1.5 and the analog/digital converters 1.6. They are subsequently further processed in the digital signal processing unit 1.8.

Figure 2:
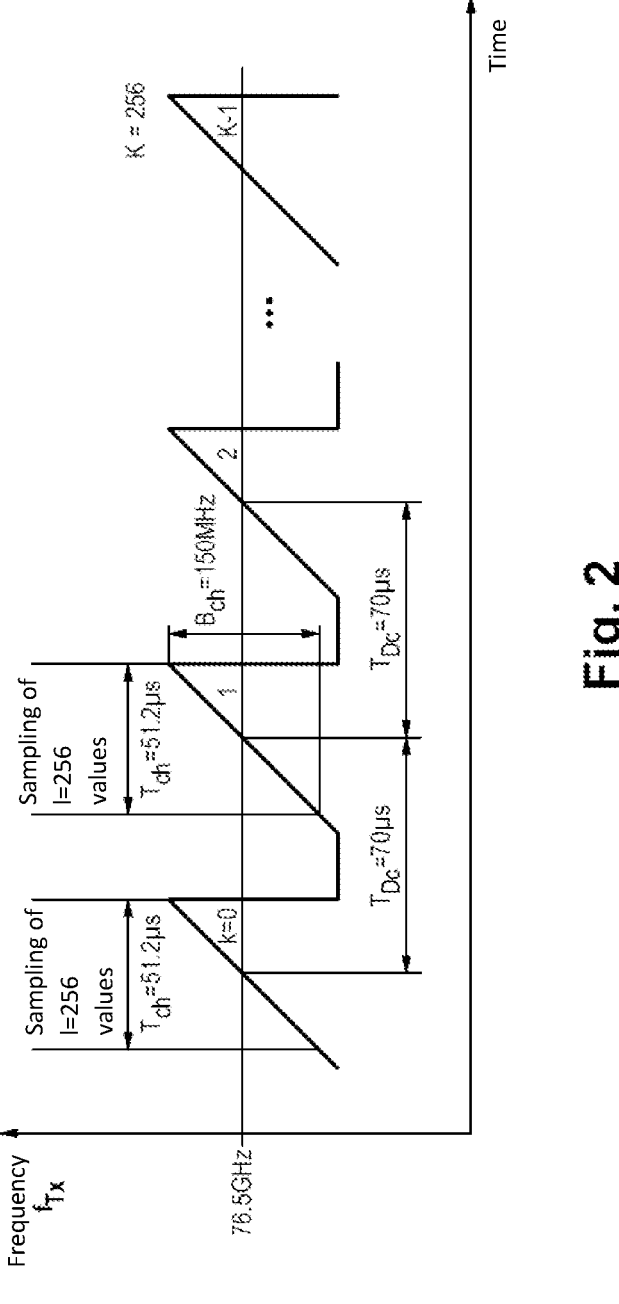
FIG. 2 shows the frequency of the transmission signals which represent so-called frequency ramps having a constant frequency position according to the prior art.

To be able to measure the distance of objects, the frequency $f_{TX}$ of the high-frequency oscillator and, therefore, of the transmission signals is—as depicted in FIG. 2—changed linearly very quickly (by $B_{ch}$=150 MHz in $T_{ch}$=51.2 µs, the center frequency $f_c$ amounting to 76.5 GHz); this is referred to as a frequency ramp (frequently also referred to as a "chirp"). The frequency ramps are repeated periodically $T_{Dc}$=70 µs in the fixed grid; overall, there are K=256 frequency ramps which all have the same frequency profile, i.e., the same frequency slope and the same frequency position (that is to say, in particular the same start and center frequency). In recent years, this type of modulation has become increasingly widespread in radars for detecting the surroundings of motor vehicles.

During each frequency ramp k=0, . . . , K−1, the received signals are in each case sampled I=256 times by each of the M=4 A/D converters m=0, . . . , M−1 in each case at intervals of 200 ns (that is to say, with 5 MHz), the sampling always beginning at the same point in time relative to the start of the ramp (see FIG. 2); the resulting digital sampled values having index i=0, . . . , I−1 are denoted by s(i,k,m). A signal sampling only makes sense in the time range in which received signals from objects arrive in the distance range of interest—that is to say that, following the ramp start, it is necessary to wait for at least the propagation time corresponding to the distance of maximum interest (in the case of a distance of maximum interest of 99 m, this corresponds to 0.66 µs); it should be noted that, here and below, distance is always understood to mean the radial distance.

As is known from the prior art and can also be derived in a simple manner, in the case of a single point-shaped object at a spacing r, the sampling signal s(i,k,m) represents a sinusoidal oscillation over the index i which in a very good approximation can be described as follows:

$$s(i,k,m)=A(m)\cdot\sin(2\pi\cdot i/I\cdot r/(\text{meter})\cdot B_{ch}/150\text{ MHz}+\varphi(k)+\varphi_0(m)), \tag{1}$$

i.e., the frequency of the oscillation is proportional to the object distance r, wherein in general a constant distance may be assumed with a very good approximation for the frequency of the sinusoidal oscillation, even in the case of a radial relative movement of the object towards the sensor. Admittedly, the relative movement having the radial component v has the following effect in the phase position $\varphi(k)$ of the sinusoidal oscillation:

$$\varphi(k)=2\pi\cdot k\cdot 2T_{Dc}\cdot v f_c/c, \tag{2}$$

i.e., the phase position changes linearly over the frequency ramps k, the rate of change in the phase being proportional to the radial relative speed v of the object. Due to the linearity of the receiver, the sampling signal s(i,k,m) results in the case of multiple and/or extended objects as a linear superimposition of sinusoidal functions of the above form.

This form of signal allows further processing with a two-dimensional Fourier transform (DFT) including suitable signal windowing for each receiving channel m, said two-dimensional DFT preferably being realized in two stages over two one-dimensional Fast Fourier Transforms (FFT). After said two-dimensional DFT, power peaks occur in the resulting spectrum S(j,l,m), the respective position of which corresponds to the distance r and relative speed v of the associated object—see FIG. 3, which shows the magnitude spectrum |S(j,l,m)/A(m)| independent of the receiving channel m in dB for three objects having the same radar cross-section, at least approximately the same azimuth angle and having the following distances and relative speeds: [$r_1$=29.5 m, $v_1$=1.09 m/s], [$r_2$=30 m, $v_2$=1.09 m/s] and [$r_3$=45 m, $v_3$=60.4 m/s]; receiver noise, which significantly lies below the power peaks of the objects which are characterized with the object numbers in the spectrum, is additionally superimposed on the signals of the objects. The dimension j=0, . . . , J−1 resulting from the dimension i (sampled value indices) is referred to by distance gates and the dimension l=0, . . . , L−1 resulting from the dimension k (frequency ramps) is referred to by Doppler gates, since the position of the power peaks in dimension j substantially results from the object distance and in dimension l from the relative speed (which is illustrated via the Doppler effect)—however, it can be neglected at this point that the power peak position also has a very small dependence, in each case, on the other of the two physical quantities distance and relative speed. It should be pointed out that the speed cannot be calculated unequivocally from the Doppler gate of the power peak, since in the case of the design presented here only an unambiguous range of 28 m/s is realized over the K=L=256 Doppler gates—ambiguities can be realized, e.g., by varying the spacing $T_{DC}$ of the frequency ramps from radar cycle to radar cycle (as explained below). According to FIG. 3, the number of the distance gates is only J=100 and therefore significantly smaller than the number I=256 of the sampled values; the background is that, on the one hand, the sampled values are real-valued, so that their spectrum is symmetrical, i.e., no additional information is contained in the upper half of the DFT and, on the other hand, the upper transition range of the analog bandpass filter 1.4 according to FIG. 1 has a frequency bandwidth of 1.09 MHz (corresponds to the range of 56 frequency interpolation points). In the case of the modulation bandwidth used here, $B_{ch}$=150 MHz, the distance gate width $B_{ch}$/150 MHz·1 m is precisely 1 m, so that the J=100 distance gates allow a maximum range of 99 m.

Figure 3:
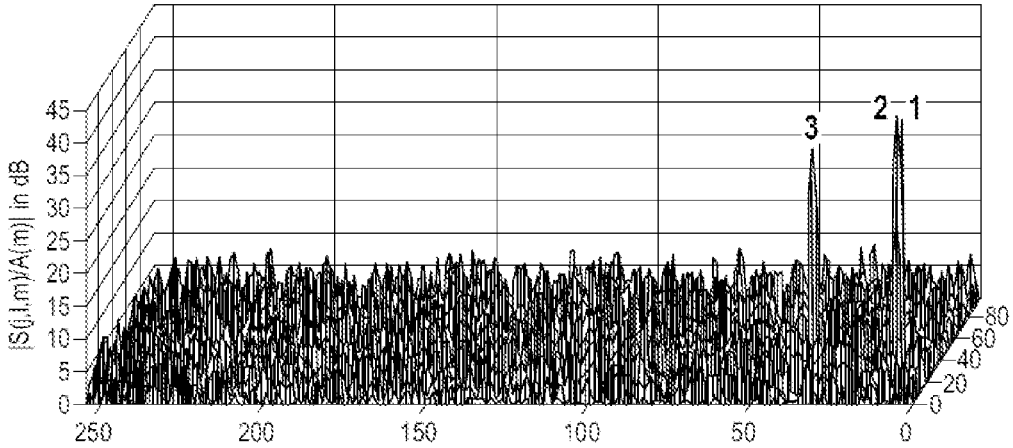
FIG. 3 shows the magnitude spectrum after the two-dimensional discrete Fourier transform for three objects and the frequency profile according to FIG. 2.

As is obvious from FIG. 3, the first two objects having [$r_1$=29.5 m, $v_1$=1.09 m/s] and [$r_2$=30 m, $v_2$=1.09 m/s] could not be separated, but are fused in one power peak because they have an identical relative speed and only a slightly different distance—their distance difference is 0.5 m and, consequently, only half a distance gate. Typically, a difference of two distance gates is needed, for instance, to separate two point-shaped objects having the same relative speed. That is to say, for a distance separation capability of these two objects, a significantly higher modulation bandwidth $B_{ch}$ would be required, at least a factor of 4 higher, that is to say $B_{ch}$=600 MHz, which leads to a distance gate width of $B_{ch}$/150 MHz·1 m=0.25 m. With the same maximum sensor range of about 99 m, 4 times more sampled values would be necessary per frequency ramp—on the one hand, this would require faster analog-to-digital converters and, on the other hand, which is even more serious, roughly 4 times more processing power and memory in the digital signal processing means.

Figure 4:
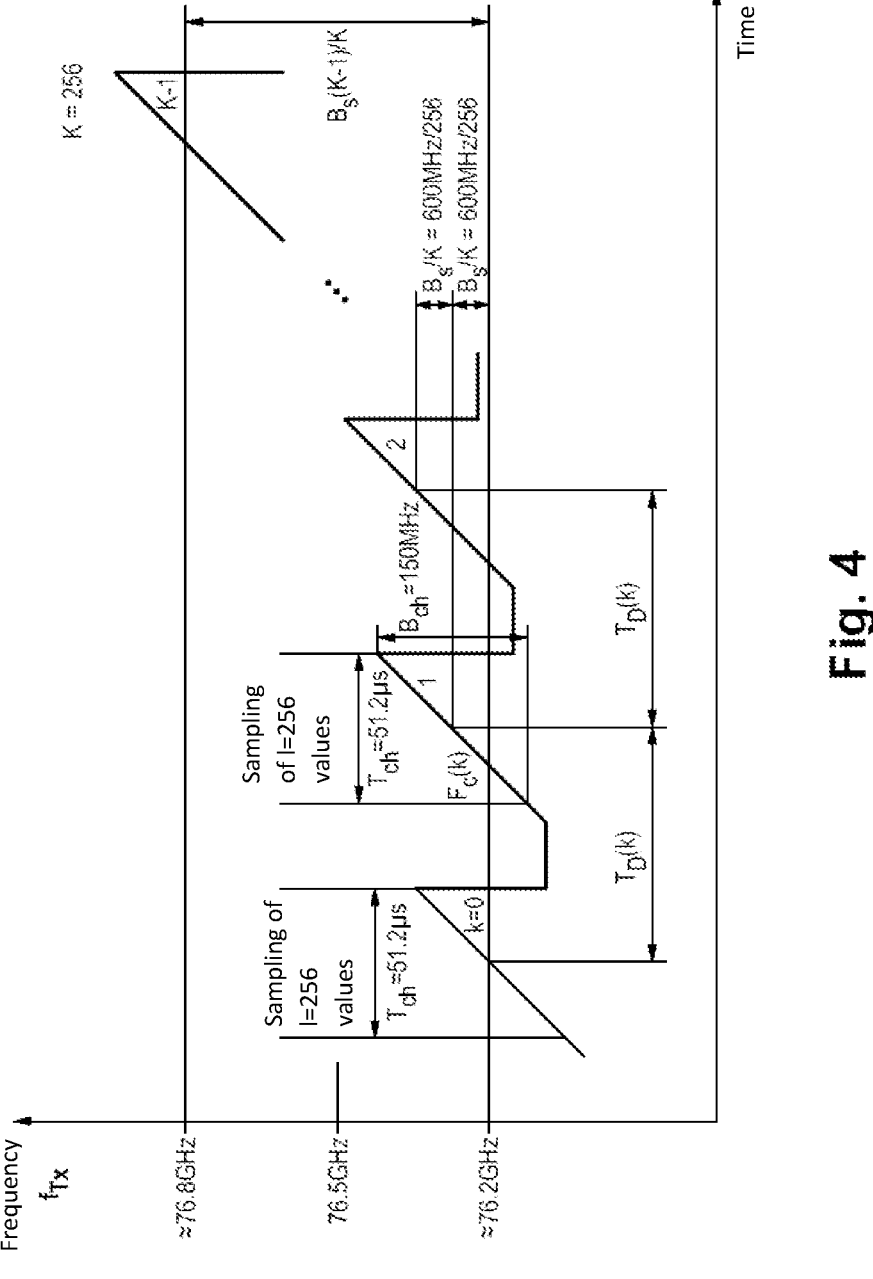
In FIG. 4, the frequency of the transmission signals having a linearly changing frequency position is depicted.
Figure 5:
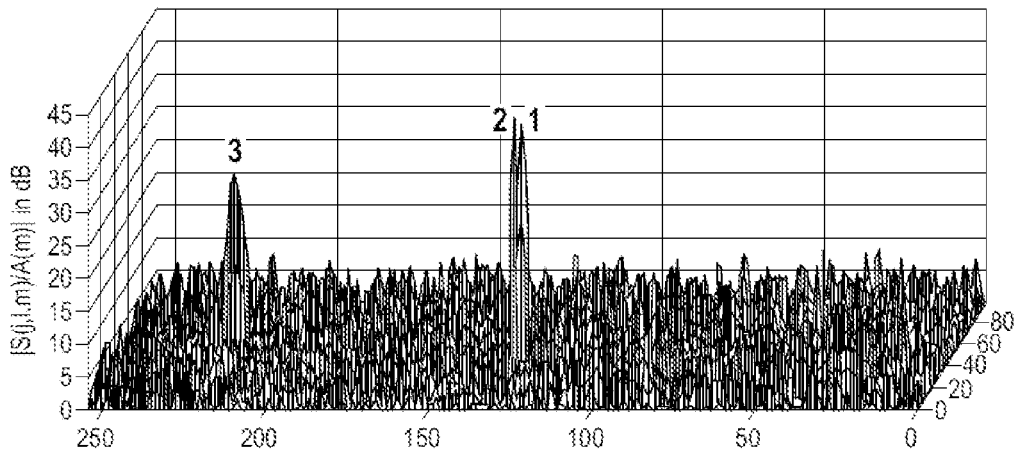
FIG. 5 shows the magnitude spectrum after the two-dimensional discrete Fourier transform for the three objects and the frequency profile according to FIG. 4, the spacing between the frequency ramps being constant.

In order to avoid this, an alternative form of modulation such as, e.g., the form of modulation known from DE 10 2013 200 404 A1 and depicted in FIG. 4 can be applied. The only change in this form of modulation with respect to that previously considered according to FIG. 2 is that the frequency position, in particular characterized by the start frequency and center frequency $F_c(k)$, now linearly increases over the K=256 frequency ramps by, in each case, the frequency Be/K where $B_s$=600 MHz; this effectively realizes a much higher modulation bandwidth and, resulting therefrom, a much better distance separation capability. The spacing between the frequency ramps is unchanged, that is to say is still constantly $T_D(k)$=70 μs. In the case of this form of modulation, the signal processing can remain unchanged in the form of the two-dimensional DFT. The magnitude spectrum |S(j,l,m)/A(m)| then resulting for the 3 objects according to the example above is depicted in FIG. 5. Compared to the original magnitude spectrum according to FIG. 3, the positions of the power peaks have now been shifted in the Doppler gate dimension l, but not in the distance gate dimension j. This results from the fact that the linearly increasing frequency position of the frequency ramp increases the number of the wave packets in the beam path from the sensor to the respective object and back (the wavelength does of course become smaller as the frequency increases), which, in the phase position φ(k) of the received values s(i,k,m) according to equation or relationship (1), has an effect as a component which changes linearly over the frequency ramps k; this is superimposed on the component produced by a radial relative movement which is likewise linear k, according to relationship (2), so that both components in principle have the same effect, that is to say, a shift in the power peak in the Doppler gate dimension. As will be shown later, the shift in the Doppler gate dimension l produced by the change in frequency position results as approximately $B_s/B_{ch}$ times the distance gate dimension j of the respective object.

As can be seen in the spectrum according to FIG. 5, the first two objects having [$r_1$=29.5 m, $v_1$=1.09 m/s] and [$r_2$=30 m, $v_2$=1.09 m/s] are now separated, i.e., form two separate power peaks, the separation taking place in the Doppler gate dimension, because of the slightly different distance of 0.5 m from the different shift produced by the change in frequency position by two Doppler gates (the difference in the Doppler gate dimension is $B_s/B_{ch}$ times higher, that is to say 4 times higher, than in the distance gate dimension where it amounts to half a distance gate).

The disadvantage of the spectrum according to FIG. 5, however, is that the third object having [$r_3$=45 m, $v_3$=60.4 m/s] now no longer has a sharp power peak, but is greatly expanded in the Doppler gate dimension. This in turn leads to multiple disadvantages: firstly, the possible detection range is reduced (since the level becomes lower), secondly, the relative speed measurement is less accurate (because the power peak is blurred) and, thirdly, it would no longer be possible to separate a further target having the same relative speed and a slightly different distance (since blurred power peaks are superimposed). The dissipation of the power peaks is all the stronger, the larger the amount of the relative speed is; the effect is not yet visible for the first two objects since their relative speed is very small.

Figure 6:
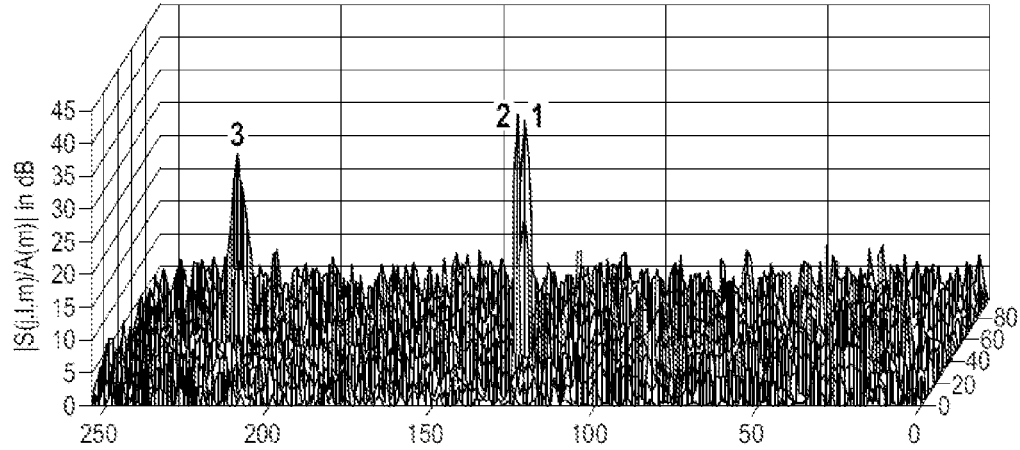
In FIG. 6, the magnitude spectrum is depicted in the event that the spacing between the frequency ramps according to WO 2018/086783 A1 is selected.

In WO 2018/086783 A1, it is proposed that the spacing $T_D(k)$ between the individual frequency ramps k=0, . . . , K−1 having center frequency $F_c(k)$ should no longer be kept constant, but should be varied in such a way that the product from $T_D(k)·F_c(k)$ is constant. For the example above, the magnitude spectrum |S(j,l,m)/A(m)| according to FIG. 6 then results. In contrast to the spectrum according to FIG. 5, the dissipation of the power peak from the third object

[$r_3$=45 m, $v_3$=60.4 m/s] having a high relative speed is indeed now smaller (about halved), but it is still present and unacceptably large.

Therefore, the approach according to the embodiment is now derived, which prevents the power peak from blurring even at high relative speeds.

The following applies to the frequency $f_{TX}(t,k)$ of the high-frequency oscillator and, therefore, of the transmission signals over the relative time t∈[−$T_{ch}$/2, $T_{ch}$/2] within the frequency ramp k:

$$f_{TX}(t,k)=F_c(k)+B_{ch}/T_{ch}·t \tag{3}$$

having the center frequency $F_c(k)$ of the frequency ramp k=0, . . . , K−1:

$$F_c(k)=F_{cc}+B_s/K·(k−(K−1)/2), \tag{4}$$

$F_{cc}$ being the mean value over all center frequencies $F_c(k)$. The phase $φ_{TX}(t,k)$ of the oscillator and transmission signal is obtained by integration as follows:

$$φ_{TX}(t,k)=2π·(F_c(k)·t+½·B_{ch}/T_{ch}·t^2), \tag{5}$$

the integration constant having no influence here and therefore being omitted.

The phase $φ_{IF}(t,k)$ of the received signal at the output of a mixer results for an individual point-shaped object from the phase difference between the current oscillator signal and the signal reflected back from the object, which is delayed by the propagation time Δt:

$$φ_{IF}(t,k)=φ_{TX}(t,k)−φ_{TX}(t−Δt,k))·s_{ch}, \tag{6}$$

$s_{ch}$ characterizing the algebraic sign of the chirp modulation bandwidth $B_{ch}$, that is to say=+1 for an ascending frequency ramp and =−1 for a descending frequency ramp. The received signal after the mixer is also referred to as an intermediate frequency signal or IF. The sampling signal s(i,k,m) of the associated receiving channel m is obtained by forming I sampled values having an index i=0, . . . , I−1 over time t∈[−$T_{ch}$/2, $T_{ch}$/2].

The propagation time Δt for an object having the radial relative speed v is calculated as follows:

$$Δt=2(r_c(k)+vt)/c; \tag{7}$$

$r_c(k)$ is the distance of the object in the center of the frequency ramp:

$$r_c(k)=r+v·T_c(k), \tag{8}$$

r representing the mean distance over all frequency ramps and $T_c(k)$ representing the absolute time in the center of the frequency ramp (the absolute time in the center of all frequency ramps being defined as 0). In this case, a constant relative speed is assumed, since the entire sequence of the K frequency ramps lasts only a very brief time, for example≤20 ms.

The phase of the intermediate frequency signal results from the relationships (5)-(7), following conversion and omitting negligibly small terms, as follows:

$$φ_{IF}(t,k)=2π·(s_{ch}·F_c(k)·2r_c(k)/c+|B_{ch}|/T_{ch}·2r_c(k)/c·t+s_{ch}·F_c(k)·2v/c·t+|B_{ch}|/T_{ch}·2v/c·t^2). \tag{9}$$

The mean intermediate frequency signal phase (i.e., at t=0) over the frequency ramps k is obtained as follows:

$$φ_{IF}(k)=2π·s_{ch}·F_c(k)·2r_c(k)/c. \tag{10}$$

The frequency of the intermediate frequency signal, that is to say, the intermediate frequency itself, results from relationship (9) by derivation:

$$f_{IF}(t,k)=|B_{ch}|/T_{ch}·2(r_c(k)+v·t)/c+s_{ch}·(F_c(k)+B_{ch}/T_{ch}·t)·2v/c. \tag{11}$$

The mean intermediate frequency $f_{IF}(k)$ of the frequency ramp k (that is to say, at t=0) is obtained as follows:

$$f_{IF}(k)=|B_{ch}|/T_{ch}\cdot 2r_c(k)/c+s_{ch}\cdot F_c(k)\cdot 2v/c; \qquad (12)$$

the first component illustrates the distance-dependent effect of the linear frequency modulation, the second component represents the Doppler effect, that is to say, the frequency shift due to the relative movement, which is generally significantly smaller here than the distance-dependent part. Averaged over all frequency ramps, the intermediate frequency $f_{IF}$ having the mean distance r (see relationship (8)) and the mean center frequency $F_{cc}$ (see relationship (4)) is obtained as follows:

$$f_{IF}=|B_{ch}|/T_{ch}\cdot 2r/c+s_{ch}\cdot F_{cc}\cdot 2v/c. \qquad (13)$$

If a one-dimensional discrete Fourier transform is formed over the sampled signal s(i,k,m) of a frequency ramp k and a receiving channel m, the result is the power peak at the distance gate $j(k)=f_{IF}(k)*T_{ch}$, i.e., with relationship (12):

$$j(k)=|B_{ch}|\cdot 2r_c(k)/c+s_{ch}\cdot F_c(k)\cdot T_{ch}\cdot 2v/c, \qquad (14)$$

and on average over all distance gates, the following is obtained from (13):

$$j=|B_{ch}|\cdot 2r/c+s_{ch}\cdot F_{cc}\cdot T_{ch}\cdot 2v/c, \qquad (15)$$

which generally represents non-integer values for j(k) or j, i.e., the actual maximum of a power peak lies between two integer distance gates considered during the DFT—its non-integer position can be determined by interpolation. After the two-dimensional DFT, the power peak lies at the mean distance gate j according to relationship (15). The change in the distance gate j(k) according to relationship (14) over the frequency ramps k is primarily produced by the slightly changing distance $r_c(k)$ at relative speed, but is comparatively small, since the distance only changes slightly over the short time of the total of K frequency ramps (typically in the range <20 ms)—after the two-dimensional DFT, this can only lead to a slight extension of the power peak in the distance gate dimension as well. The first component in the distance gate j according to relationship (15) is produced by the distance r of the object, the second component is produced by its relative speed v; the second component is normally much smaller than the first component, so that the distance gate is largely determined by the distance.

From the mean intermediate frequency signal phase $\varphi_{IF}(k)$ according to relationship (10), the following is obtained with the mean distance $r_c(k)$ according to relationship (8):

$$\varphi_{IF}(k)=2\pi\cdot(s_{ch}\cdot F_c(k)\cdot 2r/c+s_{ch}\cdot T_c(k)\cdot F_c(k)\cdot 2v/c). \qquad (16)$$

The first component in $\varphi_{IF}(k)$ changes linearly over the frequency ramps k (since the center frequency $F_c(k)$ changes linearly). For the initially examined case of a constant spacing between the frequency ramps, that is to say, a linearly changing time, $T_c(k)$ of the centers of the frequency ramps, the second component for a relative speed v≠0 is not linear, since the linear terms $T_c(k)$ and $F_c(k)$ in each case appear in one product. Due to this non-linear behavior of $\varphi_{IF}(k)$, no sharp power peak results in the resulting Doppler gate dimension I after the second one-dimensional DFT over the frequency ramp dimension k; the power peak blurs all the more the higher the non-linear component originating from $T_c(k)\cdot F_c(k)\cdot s_{ch}\cdot 2v/c$ is and, therefore, the higher the relative speed is (as could also be seen in the example according to FIG. 5).

In order to avoid this relative-speed-dependent blurring, the second component $\varphi_{IF}(k)$ according to relationship (16) must also be linear in k, i.e.:

$$s_{ch}\cdot T_c(k)\cdot F_c(k)\cdot 2v/c=(k-(K-1)/2)\cdot\text{const}$$

By solving this equation according to $T_c(k)$ and substituting the mean ramp frequency Fc(k) according to relationship (4), neglecting a very small term, the result is as follows:

$$T_c(k)=(k-(K-1)/2)\cdot T_{Dc}/(1+(k-(K-1)/2)/K\cdot B_s/F_{cc}) \qquad (17)$$

where $T_{Dc}=\text{const}\cdot s_{ch}/(2v/c\cdot F_{cc})$;

as is obvious from relationship (17), the variable $T_{Dc}$ is the mean spacing between the frequency ramps (that is to say, the mean sampling time for obtaining the Doppler gate dimension through the second discrete one-dimensional Fourier transform, which symbolizes the "D" in the index of $T_{Dc}$). Since the modulation bandwidth $B_s$ is normally much smaller than the mean transmission frequency $F_{cc}$ over the sequence of the frequency ramps, the denominator of the relationship (17) is of the form (1+x) where |x|<<1, so that the series expansion $1/(1+x)=1-x+x^2-+ \ldots$ e.g., up to the second-order term can be used as a very good approximation:

$$T_c(k)=(k-(K-1)/2)\cdot T_{Dc}\cdot(1-(k-(K-1)/2)/K\cdot B_s/F_{cc}+ \\ (k-(K-1)/2)/K\cdot B_s/F_{cc})^2). \qquad (18)$$

The time interval $T_D(k)=T_c(k)-T_c(k-1)$ between two adjacent frequency ramps is obtained with the aid of relationship (18) and omitting negligibly small terms as follows:

$$T_D(k)=T_{Dc}\cdot(1-2((k-K/2)/K\cdot B_s/F_{cc})+3((k-K/2)/K\cdot B_s/ \\ F_{cc})^2); \qquad (19)$$

since the third component contains the very small ratio $B_s/F_{cc}$ in quadratic form and is therefore normally much smaller than the linear second component in $B_s/F_{cc}$, this can also be neglected or omitted:

$$T_D(k)=T_{Dc}\cdot(1-2(k-K/2)/K\cdot B_s/F_{cc}). \qquad (20)$$

The time interval between the frequency ramps therefore changes at least approximately in a linear manner over the frequency ramps k. The relative change in the frequency ramp spacing $T_D(k)=T_c(k)-T_c(k-1)$ according to relationship (20) over the frequency ramps k=1, . . . , K−1 is as follows:

$$(T_D(k)-T_{Dc})/T_{Dc}=-2(k-K/2)/K\cdot B_s/F_{cc}. \qquad (21)$$

According to relationship (4), the relative change in their center frequency, which changes linearly over the frequency ramps k=0, . . . , K−1 $F_c(k)$, is $$(F_c(k)-F_{cc})/F_{cc}=+(k-K/2-\frac{1}{2})/2)/K\cdot B_s/F_{cc}. \qquad (22)$$

As is obvious from relationships 21 and 22, the slope of the linear relative change in the center frequency of the frequency ramps is $=+B_s/F_{cc}$ and that of their time interval=$-2B_s/F_{cc}$, i.e., the relative change in the time interval is, in terms of amount, twice as large as the relative change in the frequency position of the frequency ramps, the algebraic signs of these changes being opposite. It should be pointed out that when the time interval is determined accurately, e.g., according to relationship (19), this interrelation of the relative changes is not really exact, but rather only approximate. For the example considered above having the modulation bandwidth $B_s$=600 MHz and the mean frequency $F_{cc}$=76.5 GHz, the relative change in the frequency position is about 0.78%, viewed over the entire sequence of K frequency ramps, and the relative change in their time interval is −1.56%. It should also be mentioned that if the ramp spacing is designed according to WO 2018/086783 A1, the relative changes in the time interval and frequency position of the frequency ramps would be inverse and, in amount terms, the same size, that is to say, they would not differ by a factor of 2 in the amount.

Figure 7:
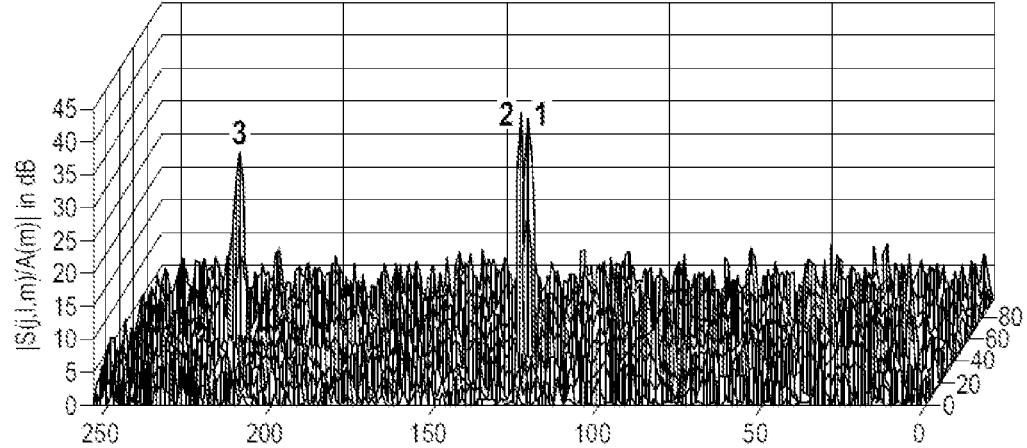
FIG. 7 shows the magnitude spectrum in the event that the spacing between the frequency ramps according to this embodiment is selected.

With this choice of the time interval of the frequency ramps (that is to say, $T_D(k)$ according to relationship (20)), the magnitude spectrum $|S(j,l,m)/A(m)|$. depicted in FIG. 7 is produced after two-dimensional DFT. In contrast to the spectrum according to FIG. 6, the power peak from the third object [$r_3$=45 m, $v_3$=60.4 m/s] having a high relative speed is now also sharp, i.e., the dissipation was prevented, the effect of which is a level which is about 2 dB higher. The two objects [$r_1$=29.5 m, $v_1$=1.09 m/s] and [$r_2$=30 m, $v_2$=1.09 m/s] having the same relative speed and only a slightly different distance are separated unchanged.

The position of the power peak of an object in the Doppler gate dimension now has to be determined. To this end, the time $T_c(k)$ of the frequency ramp centers determined above according to relationship (17) is inserted into the intermediate frequency signal phase $\varphi_{IF}(k)$ according to relationship (16); using the relationship (4) for the center frequency $F_c(k)$ and omitting an irrelevant constant phase component, the following is obtained:

$$\varphi_{IF}(k)=2\pi \cdot s_{ch} \cdot ((k-(K-1)/2)/K \cdot B_s \cdot 2r/c+(k-(K-1)/2)/K \cdot F_{cc} \cdot T_s \cdot 2v/c), \tag{23}$$

having the duration $T_s$ of the entire frequency ramp sequence:

$$T_s=K \cdot T_{Dc}: \tag{24}$$

It is expressly emphasized that this—as required and realized by making an appropriate choice of $T_c(k)$—represents a phase profile that is linear over k.

If the second one-dimensional discrete Fourier transform is now formed over the frequency ramp dimension k, then the following power peak at the Doppler gate $I=(\varphi_{IF}(K)-\varphi_{IF}(0))/(2\pi)$ is obtained, i.e., with relationship (23):

$$I=s_{ch} \cdot (B_s \cdot 2r/c+F_{cc} \cdot T_s \cdot 2v/c); \tag{25}$$

the first component results from the distance r of the object, the second component from its relative speed v. In contrast to the distance gate j according to relationship (15), which is only dominated by one object size, namely its distance, the relative speed and distance are included with a similar degree of importance in the Doppler gate.

As can be seen by comparing relationships (25) and (15) for the resulting Doppler gate I and distance gate j, the effect of the distance in the Doppler gate dimension is $B_s/|B_{ch}|$-times stronger than in the distance gate dimension, which results in a correspondingly improved distance separation capability.

The relationships (15) and (25) for distance and Doppler gates are now rewritten particularly in that the distance and relative speed are related to their gate lengths:

$$j=r/R_{Lch}+s_{ch} \cdot v/D_{Lch} \tag{26}$$

$$I=s_{sc} \cdot r/R_{Ls}+s_{ch} \cdot v/D_{Ls} \tag{27}$$

having the distance and Doppler gate lengths:

$$R_{Lch}=c/(2|B_{ch}|),R_{Ls}=c/(2B_s),D_{Lch}=c/(2F_{cc}T_{ch}),D_{Ls}=c/(2F_{cc}T_s). \tag{28}$$

In a sensor application, the distance and relative speed of objects are not known, but the underlying object is to determine these from the positions of the power peaks after the two-dimensional DFT. Therefore, the two relationships (26) and (27) have to be solved for the distance r and the speed v; this results in:

$$r=R_L \cdot (j-|T_{ch}/T_s) \tag{29}$$

$$v=D_L \cdot s_{ch}(I-j \cdot B_s/B_{ch}) \tag{30}$$

having the modified gate lengths $$R_L=R_{Lch}/(1-B_s/B_{ch} \cdot T_{ch}/T_s),D_L=D_{Ls}/(1-B_s/B_{ch} \cdot T_{ch}/T_s). \tag{31}$$

The distance gate j and the Doppler gate I of an object are generally non-integer and can be ascertained by interpolation from the form of the power peak in the two-dimensional DFT, which only provides values at integer gates.

In addition, it must be taken into account that the Doppler gate I can typically lie in a range of values which is larger than the unambiguity range L=K of the DFT; therefore, the Doppler gate can only be determined from the DFT up to an unknown integer multiple of K. One approach to solving the ambiguity is that, similarly to the approach proposed in DE 10 2009 016 480 A1, the mean frequency ramp spacing $T_{DC}$ is varied from radar cycle to radar cycle, i.e., in the sequence of K frequency ramps output in the current radar cycle, a different value is utilized for $T_{DC}$ than during the previous sequence. The $D_{LS}$ then changed in relationship (27) then results in another value for the Doppler gate I in the current radar cycle than in the previous radar cycle with about the same relative speed, which allows the ambiguity to be resolved (the relative speed can only slightly change in the typically about 50 ms from radar cycle to radar cycle).

According to relationship (30) for determining the relative speed of an object, the effect of the linearly changing frequency position of the frequency ramps (characterized by $B_s \neq 0$) is taken into account by subtracting the component $j \cdot B_s/B_{ch}$ proportional to its distance gate from the Doppler gate I of the resulting power peak; in addition, $B_s \neq 0$ still has a slight effect on the Doppler gate width $D_L$ according to relationship (31).

Alternatively, the effect of the linearly changing frequency position can also be taken into account by correcting the phases of the values resulting in the distance gate dimension j after the one-dimensional discrete Fourier transform over the I received values per frequency ramp k=0, . . . , K−1, in each case by subtracting $2\pi \cdot j \cdot B_s/B_{ch} \cdot k/K$ for all j and k (that is to say, independently of whether there is an object there or not, which might also be unknown at this point in time); the correction can be realized by multiplication with a complex vector of length 1 and corresponding phase.

As described in the introduction, in order to determine the distance and Doppler gate of an object, the exact position of the power peak is obtained by interpolation; in particular, due to the signal windowing utilized during the DFT, a power peak not only has one level at one gate, but also at one adjacent gate at least, so that the actual, generally non-integer position can be determined from the form of the power peak, e.g., by parabolic interpolation or by using the known form of the power peaks (which is itself obtained from the DFT of the window function). Admittedly, this interpolation is not as precise as necessary; interpolation errors can occur, e.g., due to superimposed noise (in particular, if the signal-to-noise ratio is poor) or due to expanded, i.e., not point-shaped, objects. This leads to inaccuracies in the determination of the distance and relative speed of objects according to relationships (29) and (30). In particular, it is critical for the relative speed according to relationship (30) that the distance gate is included there with the factor $B_s/B_{ch}$ (that is to say, in the example above with the factor 4). The relationship (29) for determining the distance almost exclusively includes the distance gate (the Doppler gate only has a very low weight $T_{ch}/T_s$) and, consequently, virtually only one interpolation error (that is to say, from the distance gate); admittedly, this error is included with the large gate width $R_{Lch}=c/(2|B_{ch}|)$, that is to say not with the generally significantly smaller gate width $R_{Ls}=c/(2B_s)$, i.e., the accuracy of the distance determination does not benefit from the large modulation width $B_s$ and, therefore, not from the change in the frequency position over the frequency ramps (to date, this substantially only improves the distance separation capability for objects having the same relative speed). That is to say, both for distance and for relative speed, the inaccuracies mainly come from errors of the distance gate.

These inaccuracies in the determination of the distance and relative speed of distance gate errors can be avoided by not always using the same algebraic sign for the modulation bandwidth $B_s$ over the sequence of the frequency ramps, but by varying it over the radar cycles while the amount is kept constant; i.e., $+B_s$ and $-B_s$ are utilized alternately, for example, so that, every second radar cycle, the frequency position increases linearly over the frequency ramps and decreases linearly in the other radar cycles. As a result, the algebraic sign of the component of the distance changes in the Doppler gate I according to relationship (27). If the sum of the Doppler gates of one object from two radar cycles having different algebraic signs for $B_s$ is taken, then, roughly speaking, the component of the distance is eliminated and the relative speed is obtained, and vice versa if the difference of the Doppler gates is formed. Additionally, it must also be taken into account that, on the one hand, the distance changes slightly from radar cycle to radar cycle at a relative speed $v{\neq}0$ and if, on the other hand, the mean distance of the frequency ramps $T_{Dc}$ varies over the radar cycles. After a few intermediate calculation steps and simplifications, the distance $r_m$ and relative speed $v_m$ averaged over the two cycles can be obtained:

$$v_m=s_{ch}{\cdot}D_{Ls+-}{\cdot}(I_++I_-)/2/(1-D_{Ls+-}t_{+-}/(2|R_{Ls}|)) \qquad (32)$$

$$r_m=|R_{Ls}|{\cdot}(s_{ch}{\cdot}(I_+-I_-)/2-v_m/2{\cdot}(1/D_{Ls+}-1/D_{Ls-})), \qquad (33)$$

$I_+$ being the Doppler gate in the first radar cycle having a positive modulation bandwidth $+B_s$ and $I_-$ being the Doppler gate in the next radar cycle after time $t_{+-}$ having a negative modulation bandwidth $-B_s$; the "mean" Doppler gate width $D_{Ls+-}$ is obtained from the, optionally, different Doppler gate widths $D_{Ls+}$ and $D_{Ls-}$ of the two radar cycles (having a different mean frequency ramp spacing) as follows:

$$D_{Ls+-}=2/(1/D_{Ls+}+1/D_{Ls-}). \qquad (34)$$

In order to determine the distance and relative speed of an object, only its Doppler gates are required from the two radar cycles, but no longer the distance gates which could lead to significant errors in the previous approach. The small gate width $R_{Ls}$ of the large modulation bandwidth $B_s$ is now also relevant for the distance determination, i.e., interpolation errors are included to a correspondingly lower extent.

In particular, an accurate distance measurement is important in the near range, e.g., for functions intended to avoid a collision with an obstacle located at the side of the vehicle (e.g., guardrail) or another vehicle. The spacing is frequently smaller than the large gate width $R_{Lch}=c/(2|B_{ch}|)$, i.e., lies in the first distance gate, where the interpolation generally works particularly poorly (due to superimposition of reflections from the bumper and/or negative frequency components). By determining the distance according to the above approach solely from Doppler gates of two cycles with opposite $B_s$, even such close spacings can still be accurately determined.

In the above embodiment, the algebraic sign of the modulation bandwidth $B_s$ was changed over two radar cycles while the amount was kept constant. In principle, however, it is sufficient if the value of $B_s$ and/or the slope of the linear change in frequency position over two radar cycles change(s) in order to be able to eliminate the influence of the distance gate. A weighting factor then occurs in the required sum and difference of the Doppler gates, i.e., the resulting Doppler gate values over the two cycles are not equally weighted.

To ensure that the radar system is robust in respect of interference from other radar systems, parameters of the modulation are preferably varied, in particular similarly to the approaches indicated in the documents WO 2008/040341 A1, DE 102009 016 480 A1 and EP 2 629 113 B1, e.g.:

mean spacing between the frequency ramps from cycle to cycle (as explained above, also allows speed ambiguities to be resolved easily);

modulation bandwidth $B_s$ and/or $B_{ch}$ (amount and/or algebraic sign) from cycle to cycle;

time interval $T_D(k)$ of the frequency ramps according to relationships (19) and (20) by additional superimposition of a random or pseudo-random, mean value-free component varying over k, typically in the range of up to a few microseconds; for relatively moving objects, the reception phase then has a component which varies slightly over the frequency ramps, but which is still so small that the effects generated as a result after the DFT (noise and level reduction of the peak power) are negligible;

frequency position $F_c(k)$ of the frequency ramps (that is to say, their center frequency) according to relationship (4) by additional superimposition of a random or pseudo-random mean value-free component varying over k; this variation in the frequency position can also be achieved by always utilizing the same frequency ramps, but varying the point in time as of which the sampled values of the received signal are obtained; the resulting phase variation of the received signals, which is proportional to the distance gate, can be compensated for by a corresponding general phase correction after the first one-dimensional DFT;

phase position of the individual transmission signals by an additional phase modulator in the transmission means, with the phase position being varied randomly or pseudo-randomly over the frequency ramps, which is preferably to be compensated again on the receiving side in the digital signal processing means.

In the radar system considered according to FIG. 1, there are M=4 receiving antennas and associated receiving channels m=0, . . . , M−1. After the two-dimensional DFT, a digital beam shaping, e.g., is also preferably calculated again in the form of a DFT or FFT in each distance/Doppler gate (j, I); that is to say, a three-dimensional Fourier transform is carried out. Power peaks are then determined in the three-dimensional spectrum. The azimuth angle of an object results from the position of its power peak in the third dimension which is created from the dimension m of the receiving channels; according to the above interrelations, the distance and relative speed result from the other two dimensions. In order to have more channels available for the angle formation, not only are multiple receiving antennas preferably utilized, but also multiple transmitting antennas, the signals of all combinations of transmitting and receiving antennas being evaluated in order to achieve as many virtual receiving channels as possible. If all or some of the transmitting and/or receiving antennas are not operated simultaneously, then multiple preferably identical sequences of frequency ramps of the type described above are nested within one another.

In summary, the method presented here by way of example allows a distance measurement with high accuracy and separation capability by utilizing a high modulation bandwidth, without the measurement and detection quality, on the one hand, being reduced in the case of relatively moving objects and without requiring a high computing power, on the other hand, in the digital signal processing means (the latter is the case with conventional methods having a high modulation bandwidth). The fact that only a moderate computing power is required is, on the one hand, due to the fact that the discrete Fourier transform can be utilized in its fast implementation as an FFT for the calculation, and that, on the other hand, the dimension of the multidimensional FFT is smaller than in conventional methods having a high distance resolution and measurement accuracy, since the distance measurement is partially shifted into the dimension in which the relative speed is also measured. This exploits the situation that in automotive radar systems for detecting the surroundings, a high distance separation capability is required mainly for targets having the same radial relative speed. Corresponding examples of radar systems for detecting the surroundings of the ego vehicle are the end of a traffic jam ahead, a stationary vehicle under a bridge or next to a guardrail, the stationary surroundings of the road (guardrail, trees, buildings, etc.) and the length and width measurement of other vehicles (which normally each have numerous reflection points). Therefore, a good distance separation capability is also important because the angle separation capability of radar systems is comparatively poor due to the generally large beam width (due to the limited size) which can, e.g., lead to the fact that reflections from the right and left guardrail cannot be separated and fuse in such a way that the measured angle lies on the vehicle's own lane and, as a result, this is incorrectly presumed to be a stationary obstacle (e.g., stationary vehicle).

Additionally, it should be mentioned that for scenarios involving many targets having slightly different relative speeds and distances, the method can only partially demonstrate its advantages, since the total number of detection gates, that is to say, distance-Doppler gates, is not increased by increasing the modulation width over the linear frequency position change of the frequency ramps. However, such scenarios are generally of little relevance to the driver assistance functions described above.

It should be pointed out that the considerations and explanations according to the embodiment presented on the basis of the above embodiment example can be transferred to general measurements and parameter designs, i.e., they can also be applied to other numerical values. Therefore, general parameters are also indicated in formulas and figures.

The invention claimed is:

1. A method of controlling a radar system, the method comprising:

emitting transmission signals which contain a sequence of identical individual signals, wherein over the sequence of the individual signals, a center frequency position of the individual signals, and a time interval thereof, are changed approximately linearly, the amount of the relative change in the time interval being at least approximately twice as large as the amount of the relative change in the frequency position and the algebraic signs of these changes being opposite.

2. The method according to claim 1, wherein a random or pseudo-random component is superimposed on the frequency position, the time interval and/or the phase position of the individual signals.

3. The method according to claim 1, wherein the frequency of the individual signals is linearly modulated and the slope of the frequency modulation is at least identical for all the individual signals.

4. The method according to claim 3, in which during K frequency ramps, numbered k=0, . . . , K−1, in each case I digital received values, numbered i=0, . . . , 1−1, are acquired in each case for multiple receiving channels and a two-dimensional discrete Fourier transform is carried out over the I·K received values in each case, the dimension resulting from the received value index dimension i following transformation being distance gates j=0, . . . , J−1 and the dimension resulting from the frequency ramp dimension being Doppler gates l=0, . . . , L−1.

5. The method according to claim 4, in which the linear changes in the frequency position and in the time interval of the individual frequency ramps lead to the received signals from transmission signals reflected by objects after the two-dimensional discrete Fourier transform also leading to sharp power peaks when the objects are moving towards or away from the radar system.

6. The method according to claim 5, wherein the linear change in the frequency position of the frequency ramps is taken into account in that, for the determination of the radial relative speed of an object, the position of its power peaks after the two-dimensional discrete Fourier transform is corrected in the Doppler gate dimension l by a component linearly dependent on the distance gate dimension j, with the linearity factor resulting from the quotient of the change in the frequency position over the frequency ramps and the change in the frequency within the reception period during the individual frequency ramps and the position of the power peak being determined results in non-integer values here for the distance gate dimension j and/or the Doppler gate dimension l.

7. The method according to claim 5, wherein the linear change in the frequency position of the individual frequency ramps is taken into account in that after a one-dimensional discrete Fourier transform over the I received values per frequency ramp k=0, . . . , K−1, the phases of the values resulting in the distance gate dimension j are in each case corrected by a phase component proportional with respect to the product $2\pi \cdot j \cdot k/K$, with the proportionality factor resulting from the quotient of the change in the frequency position over the frequency ramps and the change in the frequency within the reception period during the individual frequency ramps and the correction is realized by multiplication with a complex vector of length 1 and corresponding phase.

8. The method according to claim 1, wherein the sequence of K individual transmission signals is repeated cyclically and, the slope of the linear frequency position change over the individual transmission signals is varied from sequence to sequence in one of the sequences.

9. The method according to claim 8, wherein the individual transmission signals represent frequency ramps and two cycles having an inverse slope are utilized for an accurate radial distance and/or relative speed measurement of an object, and wherein the sum and the difference of its positions of the power peak resulting in the two cycles after the two-dimensional discrete Fourier transform are only substantially used in the Doppler gate dimension, but not in the distance gate dimension.

10. The method according to claim 1, wherein the sequence of K individual frequency ramps is repeated cyclically and, the slope of the frequency ramps itself is varied from sequence to sequence in one of the sequences.

11. The method according to claim 1, wherein the sequence of K individual transmission signals is repeated cyclically and their mean time interval is at least varied from sequence to sequence in one of the sequences.

12. The method according to claim 1, wherein multiple receiving channels are realized by multiple transmitting and/or receiving antennas and, in addition to the two-dimensional discrete Fourier transform over I·K received values in each case, there is a digital beam shaping over receiving channels or in order to generate receiving channels.

\*  \*  \*  \*  \*